United States Patent [19]

Woerwag

[11] 4,394,606
[45] Jul. 19, 1983

[54] SPEED CONTROL CIRCUIT FOR ELECTRIC MOTOR

[75] Inventor: Peter Woerwag, Stuttgart, Fed. Rep. of Germany

[73] Assignee: Dupro A.G., Romanshorn, Fed. Rep. of Germany

[21] Appl. No.: 209,154

[22] Filed: Nov. 21, 1980

[30] Foreign Application Priority Data

Nov. 21, 1979 [DE] Fed. Rep. of Germany ....... 2946930

[51] Int. Cl.³ .......................................... H02P 5/06
[52] U.S. Cl. ..................................... 318/434; 318/729; 318/798; 318/809; 318/332
[58] Field of Search ............... 318/332, 317, 339, 341, 318/342, 345 R, 345 A, 345 B, 345 D, 345 M, 434, 729, 798, 805, 807, 809, 812; 361/23, 24, 30, 31

[56] References Cited

U.S. PATENT DOCUMENTS

| | | | |
|---|---|---|---|
| Re. 29,275 | 6/1977 | Berman et al. | 318/332 X |
| 3,358,205 | 12/1967 | Wechsler | 318/332 |
| 3,855,511 | 12/1974 | Smith | 318/332 X |
| 4,039,913 | 8/1977 | Clegg | 318/332 X |
| 4,126,889 | 11/1978 | Ibamoto et al. | 318/341 X |
| 4,163,999 | 8/1979 | Eaton et al. | 361/23 |
| 4,168,454 | 9/1979 | Gmeinder | 318/332 X |
| 4,215,383 | 7/1980 | Boyd et al. | 318/332 X |
| 4,218,730 | 8/1980 | Marumoto et al. | 318/332 X |

*Primary Examiner*—J. V. Truhe
*Assistant Examiner*—Richard M. Moose
*Attorney, Agent, or Firm*—Schwartz, Jeffery, Schwaab, Mack, Blumenthal & Koch

[57] ABSTRACT

Disclosed is an apparatus for controlling the rotational speed of an electric motor based upon the load encountered by the electric motor. A load sensor provides a voltage level based upon the operating load of the electric motor and accumulates this voltage in accordance with the cycle of the alternating current supplied to the motor. If during a cycle of the alternating current, the voltage exceeds a predetermined level, a transistor will be biased into conduction, said transistor turning off a thyristor and preventing any further conduction of the thyristor during that cycle of the alternating current. Thus the duty cycle of the thyristor determines the total amount of current supplied to the electric motor and this current level determines the rotational rpm of the motor.

10 Claims, 6 Drawing Figures

4,394,606

SPEED CONTROL CIRCUIT FOR ELECTRIC MOTOR

BACKGROUND OF THE INVENTION

The present invention relates generally to speed control systems for electric motors and specifically to a speed control system based upon motor load for the electric motor in a powered textile floor covering brush.

Brush vacuum cleaners are used to clean textile floor coverings, where, in addition to a dirt aspirating air flow, there is also a roller-like brush provided to detach the dirt particles adhering to the floor covering. This roller-like brush is driven by an electric motor through an intermediary belt and can be so adjusted in height with respect to the floor surface so that the bristles of the roller-like brush penetrate the pile of the carpet in order to dislodge dirt in the carpet-pile fibers. In this manner both the dirt adhering in the carpet pile is loosened and the fibers bent by walking on them are righted. However there is a difficulty in that the pile-height of textile floor coverings can differ substantially. For instance there are coverings with a smooth, felted surface, and also high-pile or long-pile carpets of which the fiber bundles are mostly twisted like yarn and may be up to 30 mm long.

In order the clean various textile floor coverings using a roller brush which is mounted into a suction nozzle of a vacuum cleaner, different angular speeds of the roller brush are required to achieve the highest possible cleaning effect. For instance, smooth felted surfaces as well as cut-pile carpets with a pile height of 5–6 mm can be cleaned at brush speeds of about 6,000 rpm, whereas substantially lesser brush speeds of about 3,000 rpm may be appropriate to clean high or long pile carpets.

In prior art brush vacuum cleaners or adapter suction means, two different values can be set for the rotational speed of the roller brush. The setting of the appropriate rotational speed is generally performed manually, and frequently the wrong brush rotational speed will be set either due to the ignorance of the operator or forgetfulness. If the rotational speed set is excessive, the motor may be overloaded and excess stress is placed on high or long pile carpets, and too low a rotational speed may result in inadequate cleaning.

SUMMARY OF THE INVENTION

It is therefore an object of the present invention to provide a circuit for automatically controlling the motor speed depending upon the load encountered by the rotating roller brush.

It is a further object of the present invention to automatically set the most advantageous motor rotational speed for a particular floor covering in a brush vacuum cleaner.

It is a still further object of the present invention to provide an automatic shutoff for an electric motor which is being overloaded.

The above and other objects are achieved in accordance with the present invention by an electronic circuit which senses the load current through an electric motor and controls the rotational speed of the motor as a function of the load current therethrough. In one embodiment, a thyristor during conduction permits current to flow through the motor and a measuring resistor. However if the voltage drop across the measuring resistor becomes larger (indicative of a higher motor load current), the duty cycle of the thyristor in conduction is reduced lowering the motor load current and the motor rotational speed.

BRIEF DESCRIPTION OF THE DRAWINGS

A more complete appreciation of the invention and the attendant advantages thereof will be more clearly understood by reference to the following drawings wherein:

FIG. 2B is a wave form illustrating the operation of the embodiment of FIG. 2a;

DETAILED DESCRIPTION OF PREFERRED EMBODIMENTS

Figure 1A:
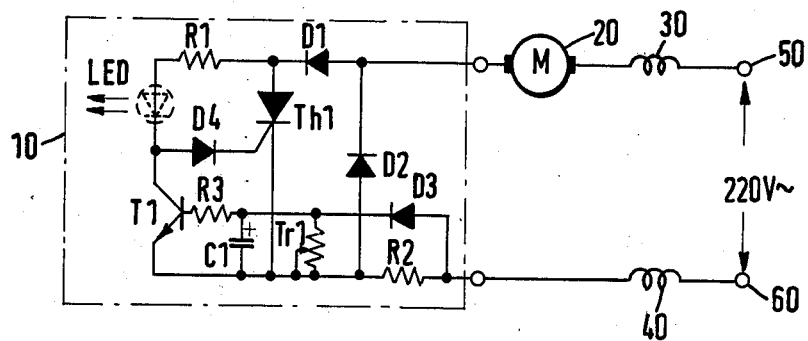
FIG. 1A is an electrical schematic of one embodiment of the present invention.

Referring now to the drawings wherein like reference characters designate like parts throughout the several views, the solution by means of the present invention will use the electric motor-circuit load current, which depends on the pile height, i.e. on the motor load, to automatically control the motor rotational speed. On account of this automatic rotational speed control, there will always be the proper rotational speed of the motor, i.e. of the brush, for all textile floor coverings to be worked on. If for instance the roller brush rotates on a smooth, felted surface of a needle felt covering or on the relatively low pile (about 5 mm high) of a cut-pile carpet, the roller brush and hence the drive motor will be only slightly loaded, so that the current in the power circuit of the drive motor remains below a predetermined limit value, and accordingly no feed back control of the motor takes place. If, on the other hand, the roller brush is operated on a high-pile carpet, the brush will penetrate deeper into the carpet pile. Accordingly there is a high load on the brush and therefore on its drive motor, and the load current of the drive motor may exceed the predetermined limit value. The rotational speed of the motor should be reduced to a magnitude which will not abuse the high pile carpet. Preferably a thyristor is used for this two-point control, said thyristor being operated with firing-angle control which alternately connects and disconnects the motor load circuit from the power source. Depending on the desired control deviations, only one half-cycle of the single-phase alternating current, or in case of rectification, both half-cycles, are fed to the thyristor. In addition to the firing-angle control of the thyristor, the control circuit can also be provided with a limit-switching means to automatically turn off the drive motor in case of an overload.

Common to all four embodiments shown in FIGS. 1A, 2A, 3 and 4 is a load-dependent control means 10 regulating the angular speed of an electric universal motor 20 which is connected by its field windings 30 and 40 to terminals 50 and 60 of a single-phase 220 v power line. In conventional manner (not shown) the motor is operationally connected to the roller brush of a brush vacuum cleaner (for instance by an endless belt).

The tachometric control 10 is in series with the electric motor 20 in the load current circuit. The embodiment of FIG. 1 differs from that of FIG. 2 in that in FIG. 1 only the positive half-cycle of the line potential is used to control the motor whereas in the embodiment of FIG. 2, also in FIGS. 3 and 4, the control is for both half-cycles of the line potential. The embodiments of FIGS. 3 and 4, differ from that of FIG. 2 by the additional switch-off system 70 when a maximum permissible limit value of the motor current is exceeded.

Figure 1B:
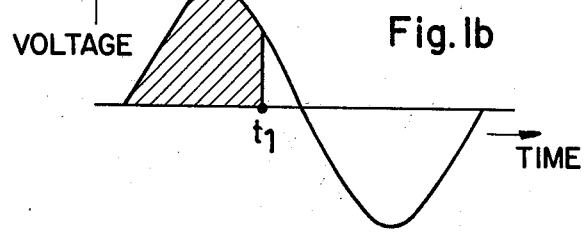
FIG. 1B is a wave form showing the operation of the FIG. 1 embodiment.

The control means provided in FIG. 1 includes a thyristor Th 1 located in the load current circuit of the motor 20 in series with a diode D1 and a measuring resistor R2. A further diode D2 is arranged in parallel with the thyristor Th1 and the diode D1, so that the load current of motor 20 for a positive half-cycle of the line potential will pass through the diode D1 and the thyristor Th1, while for a negative half-cycle it will pass through diode D2. The average potential applied to the motor 20 and hence its angular speed depends on the area under the non-shaded portions of the curve of voltage versus time shown in FIG. 1B.

Tachometric control of motor 20 is made possible by controlling the thyristor Th1 with a corresponding firing angle in the positive potential half-cycle. This control, as mentioned, depends on the magnitude of the load current which generates a proportional voltage at the measuring resistor R2. This voltage, proportional to the load current, is fed through a diode D3 to the base-emitter circuit of a switching transistor T1 which is within the control circuit of the thyristor Th1. This control circuit consists of a coupling resistor R1 coupling the required firing current for the thyristor Th1 through a diode D4 to the gate electrode of the thyristor Th1 as long as the conduction path of transistor T1, which is parallel with diode D4, is blocked. On account of the coupling through D4, thyristor Th1 will fire at the beginning of every positive half-cycle of the line potential.

Should the collector-emitter path of the transistor T1 become conducting during the negative half-cycle of the motor current and remain conducting on account of the capacitor C1 until the positive half-cycle, a new firing of the thyristor Th1 will take place only after conduction of T1 is blocked again. This condition is shown in time $t_1$ in the voltage diagram of FIG. 1B. The collector-emitter path of the transistor T1 begins conducting when the measured potential, applied through the diode D3 to the base of the transistor T1 (proportional to the load current), and the bias voltage applied through an RC link R3, C1 to the base of the transistor T1, exceeds 0.7 volts. The magnitude of the bias voltage and hence the nominal value of the control means 10 can be adjusted by a potentiometer Tr1 in parallel with the capacitor C1. Once the switching threshold is set for the transistor T1, the position of the delayed switch-on point $t_1$ relative to the beginning of a positive potential half-cycle will depend on the magnitude of the measured voltage, i.e. on the motor load current through measuring resistor R2.

Figure 2A:
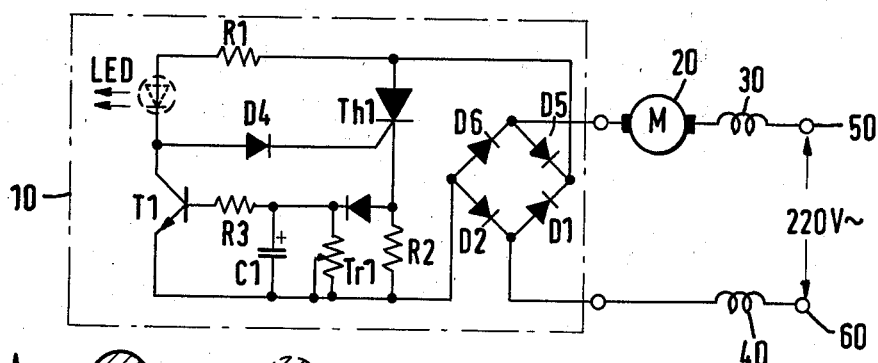
FIG. 2A is an electrical schematic of a further embodiment of the present invention.
Figure 2B:
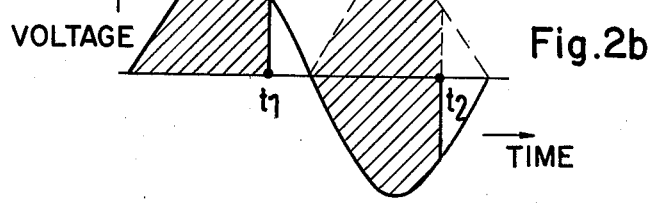

If the control during a single half-cycle is insufficient, then as shown in the embodiment of FIG. 2, a firing-angle control can be effected during both the positive and negative half-cycles of the motor supply voltage. In this case the diodes D1 and D2 of the control means 10 of FIG. 1 are replaced by a full-wave bridge rectifier with diodes D1, D2, D5 and D6, with the thyristor Th1 in series with the measuring resistor R2 connecting opposite points of the bridge rectifier D1, D2, D5 and D6 and ensures that the thyristor Th1 passes the load current both during the positive potential half-cycle and during the rectified negative potential half-cycle indicated by the dotted lines in FIG. 2B. In this manner a delayed switch-on of the thyristor Th1 can be achieved at times $t_1$ and $t_2$ both during the positive and negative potential half-cycles should a reduction in load current be necessary. By using this firing-angle control during both voltage half-cycles, the average voltage applied to the motor can be varied between minimum and maximum values. The operation of the control circuit of the thyristor Th1 will be the same as for the control circuit of FIG. 1.

A light-emitting diode (LED) may be mounted between the coupling resistor R1 and the switching transistor T1 for optically displaying the switching state of said thyristor Th1, where said LED will be dark or only slightly lit if transistor T1 is not conducting (the thyristor Th1 is firing), whereas it will be brightly lit if the switching path of the transistor T1 is conducting (the thyristor Th1 is not firing).

Figure 3:
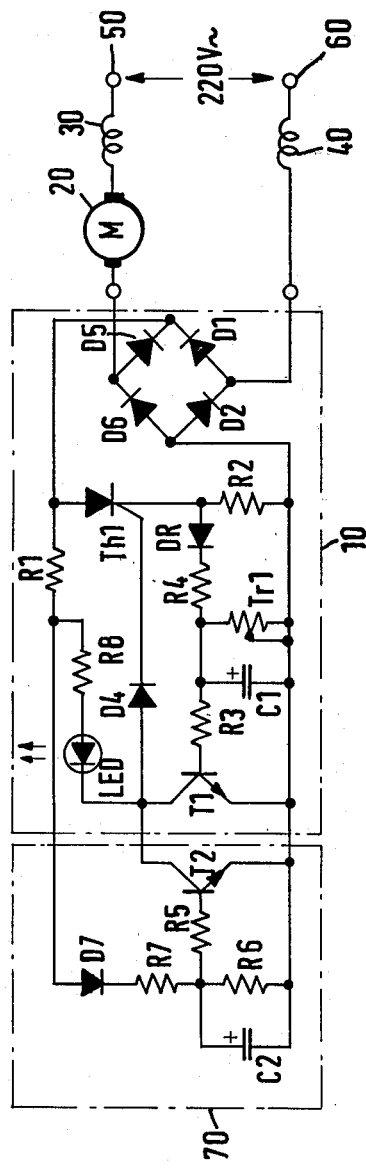
FIG. 3 is an electrical schematic of a further embodiment of the present invention.

The embodiment illustrated in FIG. 3 represents a further development of that shown in FIG. 2 and, in addition to the control system 10 designed in the same way, a switch-off system 70 is present. The switch-off system in case of a rise in the motor load current beyond a maximum permissible limit, will permanently turn off the thyristor Th1. The switch-off system 70 shown in FIG. 3 includes a further switching transistor T2 having a condution path parallel to that of the switching transistor T1 of the control means 10. The base of the switching transistor T2 is connected by a series resistor R5 to the tap of a voltage divider comprising the series circuit of a diode D7, a first divider resistance R7 and a parallel RC circuit comprised of R6 and C2. The cathode of the diode D7 is connected to the coupling resistor R1 of the control means 10. As long as the capacitor C2 is not charged—by the partial potential applied through the diode D7 and the divider resistance R7—to 0.7 volts, the switching path of transistor T2 remains blocked. Thus the charge potential of the capacitor C2 determines the switching time for the transistor T2, i.e. the maximum permissible limit value of the load current. If this limit is exceeded, transistor T2 begins conducting, and permanently turns off thyristor Th1, and, thus, shuts down the motor 20. To start motor 20 again, its power switch (not shown) must be turned off and then on again.

Figure 4:
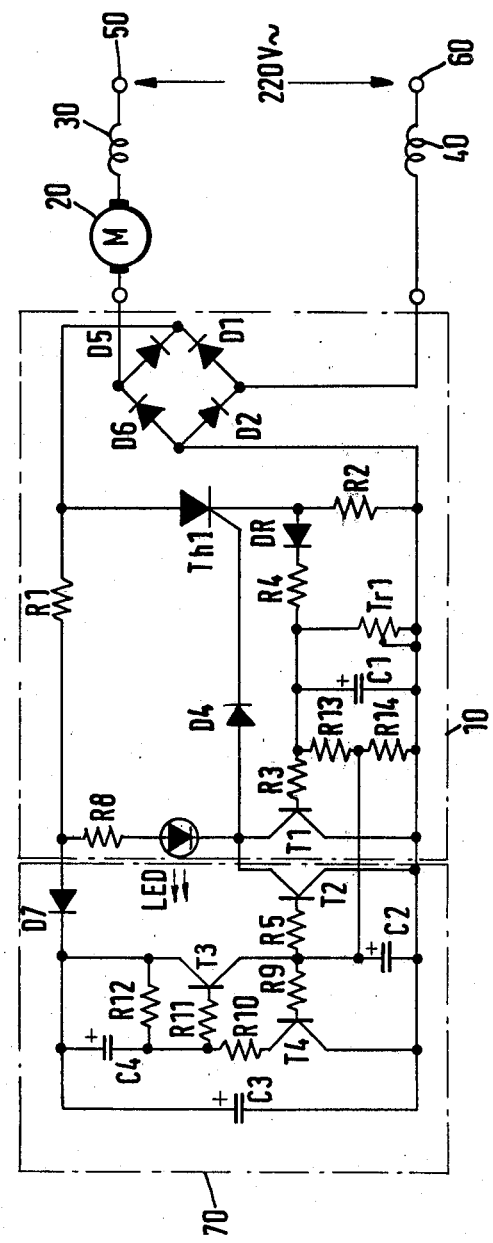
FIG. 4 is an electrical schematic of a further embodiment of the present invention.

The embodiment of FIG. 4 shows a modified design both of the control means 10 and of the switch-off system 70, from the design shown in FIG. 2. The switch-off system 70 of FIG. 4 also includes a second transistor T2 of which the switching path is in parallel with that of transistor T1 of the control means 10, the base of transistor T2 being series connected through a resistor R5 to the tap point of a voltage divider. The voltage divider comprises the two divider resistances R13 and R14 which are in parallel with the capacitor C1 in the base-emitter circuit of the switching transistor T1. The connection between R13 and R14 is also connected to smoothing capacitor C2 and is also connected to the collector of the memory transistor T3 and through the series resistor R9 to the base of switching transistor T4.

The potential is supplied to the switch-off system 70 through a diode D7 of which the cathode is connected with the coupling resistor R1 in the same manner as in the embodiment of FIG. 3, the capacitor C3 acting as a smoothing condensor. The conduction path of switching transistor T4 is in series with the resistors R10 and R12, which in turn form a voltage divider. A voltage between R10 and R12 is fed through the series resistor R11 to the base of the memory transistor T3. The switching transistor T4 becomes conducting, when the potential at the smoothing capacitor C2 exceeds 0.7 volts. With T4 conducting, the voltage between R10 and R12 is applied through resistor R11 to the base of the memory transistor T3 turning it on. The conduction path of the memory transistor T3 connects the junction between series resistors R9 and R5 with the supply potential fed through the diode D7, whereby raising the control potential for the transistors T2 and T4 well above 0.7 volts. Hence the continued conduction of the transistors T2 and T4 is guaranteed.

Furthermore, there is a shunt capacitor C4 in parallel with the divider resistor R12, to prevent such spurious signals from acting on the switching transistor T3.

Transistor T4 is connected at its base through a series resistor R9 to the junction of R13 and R14 voltage divider and transistor T2 will turn on when the maximum load current threshold value predetermined by the voltage divider of R13 and R14 is exceeded. Because the transistor T2 turns on, the control electrode of the thyristor Th1 is shut off in the same manner as for the embodiment of FIG. 2, and simultaneously, on account of the transistors T4 and T3 continuing conduction, the transistor T2 is maintained conducting as well. The shut-down of motor 20 caused by the permanent shut-down of thyristor Th1 now can be reset by turning off line switches (not shown) and turning them on again.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property of privilege is claimed are defined as follows:

1. An apparatus for cleaning textile floor coverings, said apparatus including a roller shaped brush, an electric motor for rotating said roller shaped brush, and a suction device for evacuating dirt and dust particles from said floor covering, said motor connected to an alternating current supply and having a load current passing therethrough and an adjustable rotational speed, a circuit arranged in the load circuit of the motor to control the rpm of the motor as a function of its load current, comprising:
(a) a measuring resistance connected in said load circuit for producing a measuring signal proportional to said load current;
(b) a thyristor having an anode and a cathode and being connected in at least one branch of said load circuit:
(c) a control circuit connected to actuate said thyristor, said control circuit comprising a series circuit arranged in parallel to the anode and cathode of said thyristor, said series circuit including a coupling resistor and a switching transistor having an emitter and a collector, said coupling resistor being connected to the collector of said switching transistor;
(d) said thyristor having a control electrode connected through a diode to the collector of said switching transistor, said switching transistor having a base electrode connected through a resistance to a parallel circuit comprising a capacitor and a variable resistor, and a diode connecting said measuring signal from said measuring resistance to said resistance in series with said switching transistor base electrode.

2. The apparatus according to claim 1 and further including a first steering diode connected between said motor and said control circuit for passing only the first half cycle of each cycle of current from said motor to said control circuit, and a second steering diode connected in parallel to said control circuit for allowing the second half cycle of each cycle to bypass said control circuit.

3. The apparatus according to claim 1 wherein said motor and said power supply are connected across the AC inputs of a diode bridge, and said thyristor and sensing resistor are connected in series across the DC outputs of said diode bridge.

4. The apparatus according to claim 1 and further including a light-emitting diode connected to said switching transistor for indicating conduction of said transistors.

5. The apparatus according to claim 1, 2, 3 or 4 and further including means responsive to a predetermined maximum motor load current for shutting off said motor.

6. The apparatus of claim 5 wherein said motor shut off means comprises:
(a) a first transistor having an emitter/collector circuit connected in parallel with the emitter/collector circuit of said switching transistor, and a voltage supply means for supplying a time accumulative voltage to the base of said shut off means first transistor.

7. The apparatus of claim 6 wherein said voltage supply means comprises a series circuit of at least a first resistor and a parallel RC circuit.

8. The apparatus of claim 7 wherein said voltage supply means comprises:
(a) a first voltage divider connected in the base circuit of said switching transistor for supplying a voltage to the base of said shut off means first transistor; and a second voltage divider comprising a second transistor having an emitter/collector circuit connected between the gate of said first transistor and the anode of said thyrister; a third transistor; first and second resistors in series with the emitter/collector circuit of said third transistor, said base of said third transistor connected to said base of said first transistor, said base of said second transistor connected to the junction of said first and second resistors.

9. In a device for cleaning textile floor coverings, said device having a roll shaped brush driven by an alternating current motor for the treatment of the floor covering, a suction device for drawing dirt and dust particles from the floor covering, a circuit for controlling the rpm of said electric motor, said circuit comprising:
a semi-conductor device connected between said motor and said alternating current power supply, said semi-conductor device being actuatable for electrically connecting said alternating current power supply to said motor, and deactuatable;
means for sensing current passing through said motor and providing a signal proportional thereto; and
actuation means connected to said semi-conductor device for actuating said semi-conductor device at a variable point during each cycle of current from said AC supply, said semi-conductor device being deactuated upon each zero crossing of said current from said AC supply, said actuation means being connected to receive said signal from said sensing means and being connected to said alternating current supply, and further including timing means for reducing the period of actuation of said semi-conductor device in response to an increase in said current passing through said motor, whereby as the current passing through said motor increases, the rpm of said motor is decreased.

10. The device as set forth in claim 9 wherein said semi-conductor device comprises a thyristor having a gate electrode, and said actuation means includes another semi-conductor device having an output connected to the gate of said thyristor, said other semi-conductor device being operative in a first state for applying an igniting signal to said thyristor through said gate electrode and being operative in a second state to remove said igniting signal, said timing circuit including an RC network connected to receive said signal from said sensing means, said RC network being charged in response to said signal for holding said other semi-conductor device in said second state whereby current sensed in a preceding half cycle from said AC supply charges said RC circuit to hold said other semi-conductor device in said second state, and said RC network discharges after a time duration determined by the value of said signal to place said other semi-conductor device in said first state after said time duration.

* * * * *